United States Patent
Germe et al.

(10) Patent No.: US 11,949,452 B2
(45) Date of Patent: Apr. 2, 2024

(54) COMPUTING DEVICE

(71) Applicant: SIGNIFY HOLDING B.V., Eindhoven (NL)

(72) Inventors: Michel Germe, Cormelles le Royal (FR); Muhammad Hassan, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 116 days.

(21) Appl. No.: 17/783,510

(22) PCT Filed: Dec. 7, 2020

(86) PCT No.: PCT/EP2020/084937
§ 371 (c)(1),
(2) Date: Jun. 8, 2022

(87) PCT Pub. No.: WO2021/116042
PCT Pub. Date: Jun. 17, 2021

(65) Prior Publication Data
US 2023/0014183 A1    Jan. 19, 2023

(30) Foreign Application Priority Data

Dec. 13, 2019  (EP) .................................. 19216209
Feb. 28, 2020  (EP) .................................. 20160152

(51) Int. Cl.
*H04B 10/114*   (2013.01)
*H04B 10/079*   (2013.01)
(Continued)

(52) U.S. Cl.
CPC ....... *H04B 10/116* (2013.01); *H04B 10/0795* (2013.01); *H04B 10/114* (2013.01); *H04B 17/30* (2015.01)

(58) Field of Classification Search
CPC ...... H04B 10/0795; H04B 10/114–116; H04B 10/675; H04B 10/6932; H04L 7/30; H04L 7/309
(Continued)

(56) References Cited

U.S. PATENT DOCUMENTS 9,882,640 B1 *  1/2018  Chaudhuri ............ H04W 48/20
2012/0213518 A1  8/2012  Tamai et al.
(Continued)

FOREIGN PATENT DOCUMENTS

WO      2018158356 A1     9/2018
WO   WO-2018158356 A1 *  9/2018  ............. G06Q 10/04

OTHER PUBLICATIONS

Phillipson et al: "Estimating bandwidth coverage using geometric models", 2016 21st European Conference on Networks and Optical Communications, Jun. 1-3, 2016, https://ieeexplore.ieee.org/abstract/document/7507003 (Year: 2016).*
(Continued)

*Primary Examiner* — Li Liu

(57) ABSTRACT

The invention provides a computing device for determining and conveying a bandwidth coverage of an optical communication modality within a space, wherein the space comprises at least one optical transmitter arranged for communicating over said optical communication modality; wherein the computing device comprises a controller configured to: obtain configuration data characterizing a configuration of said space; obtain lighting data characterizing the at least one optical transmitter; determine the bandwidth coverage of the optical communication modality within the space based on the configuration data and the lighting data; wherein the computing device comprises an output interface
(Continued)

configured to: convey a signal indicative of the bandwidth coverage of the optical communication modality within the space.

15 Claims, 3 Drawing Sheets

(51) Int. Cl.
*H04B 10/116* (2013.01)
*H04B 17/30* (2015.01)

(58) Field of Classification Search
USPC .......................... 398/25, 118–120, 127–131
See application file for complete search history.

(56) References Cited

U.S. PATENT DOCUMENTS

2016/0261987 A1* 9/2016 Jovicic .................... G01S 5/163
2018/0123689 A1* 5/2018 Chaudhuri ............ H04W 24/10

OTHER PUBLICATIONS

Frank Phillipson; Daniël Worm; Niels Neumann; Alex Sangers, Sjoerd-Jan Wiarda, "Estimating bandwidth coverage using geometric models", Date of Conference: Jun. 1-3, 2016. URL//:https://ieeexplore.ieee.org/abstract/document/7507003.
Kejie Qiu, et al., "Let the Light Guide Us", VLC-Based Localization, IEEE Robotics & Automation Magazine, Dec. 2016, pp. 174-183.

\* cited by examiner

COMPUTING DEVICE

CROSS-REFERENCE TO PRIOR APPLICATIONS

This application is the U.S. National Phase application under 35 U.S.C. § 371 of International Application No. PCT/EP2020/084937, filed on Dec. 7, 2020, which claims the benefits of European Patent Application No. 20160152.3, filed on Feb. 28, 2020 and European Patent Application No. 19216209.7, filed on Dec. 13, 2019. These applications are hereby incorporated by reference herein.

FIELD OF THE INVENTION

The invention relates to a computing device for determining and conveying a bandwidth coverage of an optical communication modality within a space. The invention further relates to a system comprising such a computing device and at least one optical transmitter arranged for communicating over said optical communication modality. The invention further relates to a method of determining and conveying a bandwidth coverage of an optical communication modality within a space; and a corresponding computer program product for a computing device.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT).

Radio frequency technology like Wi-Fi is running out of spectrum to support this revolution. Optical communication modalities may provide a solution. Namely: Visible Light Communication (VLC), and in particular Li-Fi, are increasingly demanded due to their capability to support higher data rates over the available bandwidth in visible light, ultraviolet, and/or infrared spectra. Other benefits of VLC and/or Li-Fi include data security, and the ability to function safely in areas otherwise susceptible to electromagnetic interference. Therefore, VLC and/or Li-Fi may be a very promising new technology to enable the next generation of immersive connectivity.

Visible-light communication (VLC) transmits data by intensity modulating optical sources, such as light emitting diodes (LEDs) and laser diodes (LDs), faster than the persistence of the human eye. Such techniques are sometimes also referred to as coded light or free-space optical communication (FSO). VLC merges lighting and data communications in applications such as illumination, signage, streetlights, vehicle lighting, and traffic signals.

Light Fidelity (Li-Fi) refers to techniques whereby information is communicated in the form of a signal embedded in visible light, infrared light or ultraviolet light emitted by a light source. The signal is embedded by modulating a property of the light, typically the intensity, according to any of a variety of suitable modulation techniques. For communication at high speed, often Infrared (IR) rather than visible light communication is used. Although the ultraviolet and infrared radiation is not visible to the human eye, the technology for utilizing these regions of the spectra is the same, although variations may occur as a result of wavelength dependencies, such as in the case of refractive indices. In many instances there are advantages to using ultraviolet and/or infrared as these frequency ranges are not visible to the human eye. However, ultraviolet frequencies can have high energy levels and thus may be considered health hazards in certain circumstances.

Based on the modulations, the information in the Li-Fi coded light can be detected using any suitable light sensor. For example, the light sensor may be a photodiode. The light sensor may be a dedicated photocell (point detector), an array of photocells possibly with a lens, reflector, diffuser or phosphor converter (for lower speeds), or an array of photocells (pixels) and a lens for forming an image on the array. E.g., the light sensor may be a dedicated photocell included in a dongle which plugs into a user device such as a smartphone, tablet or laptop, or the sensor may be integrated and or dual-purpose, such as an array of infrared detectors initially designed for 3D face recognition. Either way this may enable an application running on the user device to receive data via the light.

For instance, a sequence of data symbols may be modulated into the light emitted by a light source, such as light emitting diodes (LEDs) and laser diodes (LDs), faster than the persistence of the human eye. Contrary to radio frequency (RF) communication, Li-Fi generally uses a line-of-sight connection between the transmitter and the receiver for best performance.

Li-Fi is often used to embed a signal in the light emitted by an illumination source such as an everyday luminaire, e.g. room lighting or outdoor lighting, thus allowing use of the illumination from the luminaires as a carrier of information. The light may thus comprise both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

Wireless optical networks, such as Li-Fi networks, enable electronic devices like laptops, tablets, and smartphones to connect wirelessly to the internet. Wi-Fi achieves this using radio frequencies, but Li-Fi achieves this using the light spectrum which can enable unprecedented data transfer speed and bandwidth. Wi-Fi systems are becoming more limited in bandwidth due to interference resulting from neighboring systems and their omnidirectional radiation pattern. Wi-Fi signals can pass through walls, ceilings, doors etc. but their bandwidth reduces with the density and number of units that are used. Li-Fi is becoming more and more popular as LED lighting systems are used in place of conventional lighting systems. Contrary to Wi-Fi, Li-Fi is directional and shielded by light blocking materials, which provides it with the potential to support higher bandwidth communication in a dense area of users as compared to Wi-Fi.

Furthermore, Li-Fi can be used in areas susceptible to electromagnetic interference. Consider that wireless data is now often required for more than just traditional connected devices—today televisions, speakers, headphones, printers, virtual reality (VR) goggles and even refrigerators use wireless data to connect and perform essential communications.

SUMMARY OF THE INVENTION

Radiofrequency based wireless communication modalities (such as e.g. Wi-Fi, BLE, or ZigBee) may measure signal strength to determine the quality of reception, and may subsequently derive bandwidth. However, sufficient signal strength at a particular location may not guarantee bandwidth at that location; because an increasing number of users tapping into such a radiofrequency based wireless communication modality at that particular location may significantly reduce the bandwidth for each user. Measuring signal strength alone may not render a proper insight into bandwidth. This is a clear disadvantage.

The present application identifies that such problems with radiofrequency based wireless communication modalities may be resolved by switching to optical communication according to the invention. Namely, the shielded and secure character of optical communication ensures that a one-to-one relation exists between light transmitted and light received. That is: any optical receiver in field of view of an optical transmitter may tap into the bandwidth provided by the optical transmitter, irrespective of how many optical receivers viewing said optical transmitter.

Although optical communication modalities (such as e.g. Li-Fi) may provide advantages over radiofrequency based communication modalities (such as e.g. Wi-Fi), the directional and shielded nature of such optical communication modalities may also render a disadvantage in that the bandwidth coverage of such optical communication modalities within a space cannot be easily determined.

Hence, it is an object of the invention to provide an improved computing device, which at least alleviates the associated problems and disadvantages mentioned above. Thereto, the invention provides a computing device for determining and conveying a bandwidth coverage of an optical communication modality within a space, wherein the space comprises at least one optical transmitter arranged for communicating over said optical communication modality; wherein the computing device comprises a controller configured to: obtain configuration data characterizing a configuration of said space; obtain lighting data characterizing the at least one optical transmitter; determine the bandwidth coverage of the optical communication modality within the space based on the configuration data and the lighting data; wherein the computing device comprises an output interface configured to: convey a signal indicative of the bandwidth coverage of the optical communication modality within the space. In an embodiment, the optical communication modality may be VLC or Li-Fi.

Throughout, bandwidth coverage may mean the respective communication bandwidth that is achievable at a respective location within the space. Bandwidth coverage may alternatively be phrased as a coverage of bandwidth, or as a distribution of bandwidth, or as a heat map of bandwidth values.

Throughout the application, the phrase "determining" may alternatively be phrased as "calculating" or "computing". More specfically, for example, the feature determining of the bandwidth coverage of the optical communication modality within the space may alternatively be phrased as calculating or computing of the bandwidth coverage of the optical communication modality within the space. Hence, the controller (of the computing device) may be configured to calculate or compute the bandwidth coverage of the optical communication modality within the space based on the configuration data and the lighting data.

Since the computing device according to the invention obtains configuration data characterizing the configuration of the space which comprises the at least one optical transmitter for optical communication, and obtains lighting data characterizing this at least one optical transmitter, the computing device is able to determine (i.e. compute) the bandwidth coverage of the optical communication modality within the respective space based on the obtained data. Subsequently, the output interface of the computing device is able to convey a signal indicative of the bandwidth coverage of the optical communication modality within the space.

As a result, the present invention advantageously enables conveying the computed bandwidth coverage of the optical communication modality, which may be a particularly relevant insight in optical communication, for example to position optical receivers accordingly without requiring to measure signal strength throughout the space in real time. This is a clear advantage. Moreover, the conveying of especially the bandwidth coverage may be particularly relevant for Li-Fi.

For example, various offices may be installed with different kind of Li-Fi configurations. The present computing device can compute a Li-Fi bandwidth coverage for any of such offices with different kind of Li-Fi configurations, because the computing device merely requires the combination of said lighting data and said configuration data.

The optical transmitter may alternatively be an optical transceiver. The optical transmitter may yet alternatively be a lighting device comprising a respective optical transmitter. The optical transmitter may yet alternatively be a light beacon. The optical transmitter may yet alternatively be a sensor bundle comprising an optical transmitter (i.e. a module comprising at least one sensor which may additionally comprise such an optical transmitter, and/or an optical receiver).

In further examples: The at least one optical transmitter may be in communication and/or connection with a modem. Such a modem may provide optical communication for all optical transmitters in communication and/or connection therewith. Such a modem may therefore be advantageous in case a plurality of optical transmitters needs to provide optical communication in a space. However, such a modem may also be limited in the number of optical transmitters the modem may accommodate for providing said optical communication. Hence, since larger spaces may require an increasing number of optical transmitters to provide said optical communication (uniformly), the optical transmitters may be grouped and provided with a respective modem. A disadvantage of such a solution is that a device receiving said optical communication may cope with interference and handover issues in regions in which the optical communication provided by a transmitter of one group overlaps with the optical communication provided by a transmitter of another group. Solutions for handover and/or interference may be envisioned separately.

Throughout the application, the phrase "modem" may alternatively be phrased as optical communication modem, since as mentioned above, a modem according to the invention may provide optical communication for all optical transmitters in communication and/or connection therewith.

Hence, it may be an additional or alternative object of the invention to provide an improved computing device, which may provide insights on how to organize an installation of optical transmitters and corresponding modems within a space.

Therefore: In an embodiment, the controller may be configured to: determine a requirement parameter for rendering said bandwidth coverage of the optical communication modality within the space based on the configuration data and/or the lighting data; wherein the output interface configured to: convey a signal indicative of the bandwidth coverage of the optical communication modality within the space and indicative of the requirement parameter. The requirement parameter may be at least one of: a number of modems, a grouping of modems. Such an embodiment may be advantageous, because based on the configuration data and/or the lighting data the conveyed signal may also be indicative of the number of modems or the grouping of modems.

In an embodiment, the configuration data may comprise at least one of: a location of the at least one optical transmitter within the space; a map of the space; a height of the space; a geometry of the space; a contour of the space; a location of a furniture in said space; a location of a window in said space; a location of an aperture in said space; a location of an electronic device in said space; a location of a reflective surface in said space; a location of an illumination source in said space.

Such parameters may be advantageous in determining the bandwidth coverage of the optical communication modality within the space. A combination of such data may be obtained. For example, the map of the space or the contour of the space may provide the boundaries for the bandwidth coverage. For example, the location of the at least one optical transmitter within the space may be particularly relevant for determining the respective values of the bandwidth coverage in the space. The location of the at least one optical transmitter may for example be provided in cartesian (X,Y,Z) coordinates, or polar coordinates. The height of the space may alternatively be the height of the space at which the at least one transmitter is mounted or installed. For example, the location of a window, reflective surface or illumination source may also be used to determine the bandwidth coverage, since such parameters may influence the optical link of the optical communication modality and thereby affect the bandwidth coverage.

Configuration data may alternatively comprise a message or message type of the at least one optical transmitter, a connection to at least one optical communication modem within the space.

In an embodiment, the lighting data may comprise at least one of: a type of the at least one optical transmitter; a positioning of the at least one optical transmitter relative to a lighting device; a directionality of the at least one optical transmitter; an optical distribution of the at least one optical transmitter; a cone angle of the at least one optical transmitter; an intensity level of light emitted by the optical transmitter. Such parameters may be advantageous in determining the bandwidth coverage of the optical communication modality within the space. A combination of such data may be obtained. For example, the type and/or the cone angle of the at least one optical transmitter may provide information about the optical transmitter used and its capabilities for establishing the optical link (and hence guaranteeing an expected bandwidth for such a link). Similarly, the lighting data may be a light distribution of the optical transmitter, such as a Lambertian distribution. Said optical distribution may for example be a Lambertian distribution. For example, the positioning of a respective optical transmitter relative to a (respective) lighting device may be relevant, because the optical transmitter may be adjacent to, or comprised by, the lighting device, such that the bandwidth of the optical link established by such an optical transmitter may be affected by its very positioning relative to the lighting device (or e.g. its housing).

The lighting data and/or the configuration data does not necessarily have to be obtained (e.g. received or retrieved) at a single moment in time, e.g. some of the mentioned parameters may be obtained together, e.g. some of the mentioned parameters may be obtained separately, e.g. some of the mentioned parameters may already be known by the controller beforehand (e.g. as parameters or constants stored in a local and/or external memory operatively coupled to said controller).

In examples, the controller may obtain input data comprising the configuration data and the lighting data. Hence, both the configuration data and the lighting data may be obtained via a single data transmission of the input data.

In aspects, the lighting data may be a result of measurements. For example, the invention may provide a measurement tool for measuring e.g. the directionality of the at least one optical transmitter, the cone angle of the at least one optical transmitter, etc. Such measurements, which may define parts of the lighting data may be stored in a database, e.g. on a local or external database according to the invention. Hence, by associating such lighting parameters to e.g. the type of an optical transmitter, knowing the type of the optical transmitter may allow to retrieve also the other lighting data parameters of said optical transmitter.

In aspects, the controller is configured to determine the bandwidth coverage of the optical communication modality within the space by selecting a premeasured bandwidth coverage for an optical transmitter of the at least one optical transmitter based on the lighting data and/or the configuration data, and projecting the premeasured bandwidth coverage within a map or contour of the space at each respective location of said optical transmitter of the at least one optical transmitter.

Moreover, in aspects, the controller is configured to translate, for a respective location having an overlap in premeasured bandwidth coverage of at least two respective optical transmitters, the premeasured bandwidth coverage to a signal strength coverage, sum said signal strength coverage to a resulting signal strength coverage, and finally translate the resulting signal strength coverage (back) to the bandwidth coverage according to the invention (e.g. with a correlation).

For example, this advantageously enables the computing device according to the invention to obtain the premeasured bandwidth coverage for a single optical transmitter and the locations at which such a single optical transmitter is installed within the space, and subsequently compute the bandwidth coverage of the optical communication modality within the space. The translation in-between to signal strength may be advantageous to enable the addition of overlapping areas (as merely adding up bandwidth values does not suffice, a translation back-and-forth to signal strength by using correlations, may be required to render the correct bandwidth values in such overlapping areas).

In an embodiment, the controller may be configured to retrieve and/or receive said configuration data and/or said lighting data from a remote server. The computing device may for example be a portable user device, which may retrieve and/or receive said configuration data and/or said lighting data from the remote server, e.g. on request upon selecting a user interface element on a user interface of the portable user device. The configuration data and/or said lighting data may be (pre) stored on said remote server, e.g. after a commissioning of the space, or installment of the at least one lighting device, or after measurements with a measurement tool during a pre-installment phase. The portable user device may e.g. communicate with said remote server via Wi-Fi, Bluetooth, VLC, RF, IR, ZigBee, Lo-Ra, etc. The remote server may be phrased as remote database.

In examples, at least part of the lighting data may be stored on said remote server, whereas the configuration data may be obtained via a user input of a user input device.

In an embodiment, the computing device may comprise a local memory for storing the configuration data and/or said lighting data, and the controller may be configured to retrieve said configuration data and/or said lighting data from the local memory.

In an embodiment, the controller may be configured to receive said configuration data and/or said lighting data from a sensor device and/or a user input device. In a system comprising the computing device and such a user input device, the user input device may transmit the lighting data and/or the configuration data to the computing device via a wired or wireless connection, e.g. upon a user selecting a user input element in a user interface of the user input device. Said data may e.g. be user inputted or be measured with sensors associated with the user input device. In a further embodiment, the sensor device may comprise one of: a camera, a PIR sensor, a microwave sensor, a LIDAR sensor, and/or a range sensor.

In an embodiment, the output interface may comprise a display, wherein the controller is configured to display the signal on said display. The display may for example be a touchscreen display. The display may be phrased as a user interface.

In examples, the controller may be configured to display at least part of the signal on said display. In examples, the controller may be configured to display a representation of the signal on said display.

In further examples thereof, the computing device may further comprise an optical communication module, wherein the signal may be displayed on said display upon the controller establishing an optical communication link between the optical communication module and the respective optical transmitter. This is particularly advantageous, because upon establishing an optical communication link, the computing device may display the bandwidth coverage within the space, so as to facilitate the correct positioning and/or orientation of the optical transceiver of the computing device. Thereby, in such examples, the computing device may for example be a portable user device.

In an embodiment, the output interface may comprise a transmitter, wherein the controller may be configured to transmit the signal via said transmitter to a user device.

In an embodiment, the controller may be configured to receive an output file of a lighting design application, wherein the output file of said lighting design application comprises the configuration data and/or said lighting data. Said lighting design application may for example be DIALux or similar CAD based lighting design applications. Said lighting design application may also be phrased as an interior (architectural) design application. Said output file may for example be a layout file, e.g. a layout file exported from DIALux. The layout file may thus be imported. A user may digitally input said layout file.

Furthermore, in optical communication, it may be difficult to obtain light emitted by multiple optical transmitters at the same time. Therefore, as mentioned before, it may be advantageous to determine a bandwidth coverage within a space when considering an optical communication modality. Hence, in an embodiment, the configuration data may comprise a map of the space; wherein the signal may comprise a format having a value representation of the bandwidth coverage of the optical communication modality within the space represented in the map of the space. Said map may alternatively be e.g. a contour of the space, or e.g. a geometrical indication of said space.

In an embodiment, an optical transmitter of the at least one optical transmitter may be positioned asymmetrically within a respective lighting device; and wherein the lighting data may comprise a positioning of the respective optical transmitter relative to the respective lighting device.

It is a further object of the invention to provide an improved system according to the invention, which at least alleviates the problems and disadvantages mentioned above. Thereto, the invention further provides a system for determining and conveying a bandwidth coverage of an optical communication modality within a space, wherein the system comprises: the computing device according to the invention, and at least one optical transmitter arranged for communicating over said optical communication modality. Thereby, advantages and/or embodiments applying to the computing device according to the invention may mutatis mutandis apply to said system according to the invention.

In an embodiment, the system comprises a user device; wherein the user device is configured to transmit the lighting data and/or the configuration data to the computing device; wherein the computing device is configured to convey the signal indicative of the bandwidth coverage of the optical communication modality within the space to said user device. This is advantageous, as the user device does not need to convert the signal to bandwidth coverage, as the computing device has already determined said bandwidth coverage in a format that can readily be used by the user device to render said bandwidth coverage of the optical communication modality within the space (on e.g. a user interface (e.g. a display) of said user device).

It is a further an object of the invention to provide an improved method of determining and conveying a bandwidth coverage of an optical communication modality within a space, which at least alleviates the problems and disadvantages mentioned above. Thereto, the invention provides a method of determining and conveying a bandwidth coverage of an optical communication modality within a space, wherein the space comprises at least one optical transmitter arranged for communicating over said optical communication modality; wherein the method comprises: obtaining configuration data characterizing a configuration of said space; obtaining lighting data characterizing the at least one optical transmitter; determining the bandwidth coverage of the optical communication modality within the space based on the configuration data and the lighting data; conveying a signal indicative of the bandwidth coverage of the optical communication modality within the space. Thereby, advantages and/or embodiments applying to the computing device according to the invention may mutatis mutandis apply to said method according to the invention.

It is a further an aspect of the invention to provide an improved method of storing a premeasured bandwidth coverage for an optical transmitter in a database, wherein the method comprises: obtaining lighting data and/or configuration data associated with at least one optical transmitter; moving a measurement tool within a space relative to at least one optical transmitter; the measurement tool measuring a bandwidth coverage of the optical communication modality of the at least one optical transmitter within the space; storing the measured bandwidth coverage in the database in association with the obtained lighting data and/or configuration data. Such steps of the method may be depicted schematically in boxes indicating the steps.

The lighting data and/or configuration data may for example be obtained by user input. The measurement tool may for example be a portable device. For example, the measurement tool may be an optical receiver.

For example: Before installation of optical transmitters within an office, an optical receiver may be moved in a space relative to the at least one optical transmitter. The lighting data (i.e. e.g. type of the at least one transmitter, not limited to, merely an example) and the configuration data (height of the at least one transmitter, not limited to, merely an example) may be provided by user input. The measured bandwidth coverage for that particular transmitter and for that installation height may be stored altogether in the database. The computing device according to the invention may retrieve or receive said premeasured bandwidth coverage from said database. The database may for example be a local database or an external database, such as a server or cloud.

Hence, the method of storing a premeasured bandwidth coverage for an optical transmitter in a database advantageously allows to use said premeasured bandwidth coverage in computing devices (that are able to convey a signal indicative of the bandwidth coverage of the optical communication modality within the space) to design elaborate optical communication configurations within a space (e.g. office) or to check the performance of such configurations.

The invention further relates to a computer program product. Hence, the invention provides a computer program product for a computing device, the computer program product comprising computer program code to perform the method(s) according to the invention when the computer program product is run on a processing unit of the computing device. Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

As mentioned, the optical transmitter may yet alternatively be a lighting device comprising a respective optical transmitter. Hence, in aspects, the invention may provide: A computing device for determining and conveying a bandwidth coverage of an optical communication modality within a space, wherein the space comprises at least one lighting device comprising a respective optical transceiver arranged for communicating over said optical communication modality; wherein the computing device comprises a controller configured to: obtain configuration data characterizing a configuration of said space; obtain lighting data characterizing the at least one lighting device; determine the bandwidth coverage of the optical communication modality within the space based on the configuration data and the lighting data; wherein the computing device comprises an output means configured to: convey a signal indicative of the bandwidth coverage of the optical communication modality within the space.

In further aspects the invention provides: a computing device for determining and conveying a requirement parameter of an optical communication modality within a space, wherein the space comprises at least one optical transmitter arranged for communicating over said optical communication modality; wherein the computing device comprises a controller configured to: obtain configuration data characterizing a configuration of said space, and/or obtain lighting data characterizing the at least one optical transmitter; determine the requirement parameter of the optical communication modality within the space based on (respectively) the configuration data and/or the lighting data; wherein the computing device comprises an output interface configured to: convey a signal indicative of the requirement parameter of the optical communication modality within the space. Thereby, the requirement parameter may be at least one of: a number of modems, a grouping of modems. Thereby, advantages and/or embodiments applying to the computing device according to the first object of the invention may mutatis mutandis apply to this computing device according to the further aspects of the invention.

BRIEF DESCRIPTION OF THE DRAWINGS

The invention will now be further elucidated by means of the schematic non-limiting drawings.

DETAILED DESCRIPTION OF THE EMBODIMENTS

Figure 1:
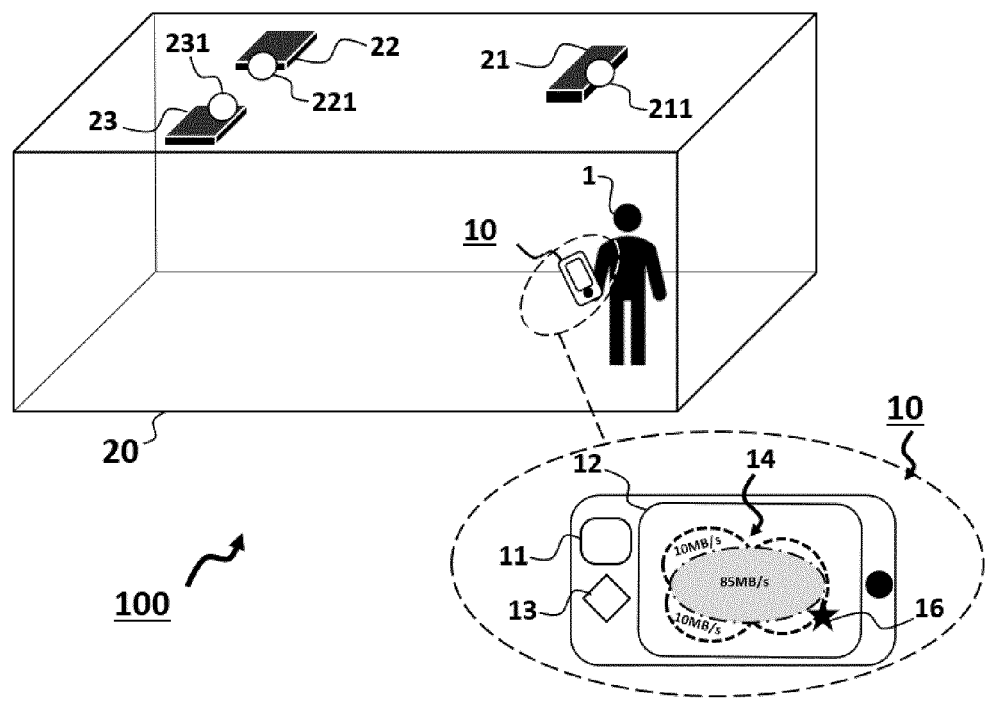
FIG. 1 depicts schematically a system according to the invention comprising the computing device according to the invention.

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 depicts schematically, by non-limiting example, a system 100 according to the invention. The system 100 comprises a computing device 10 according to the invention. The system 100 is embodied within the space 20. The space 20 is an indoor office, but may alternatively be any other indoor or outdoor space. The space 20 comprises a plurality of lighting devices 21, 22, 23. The first lighting device 21, the second lighting device 22 and the third lighting device 23 are all mounted to the ceiling of said space 20. The computing device 10 is a portable user device, which is carried by a user 1 present in said space 20.

The computing device 10 is configured to determine (or alternatively phrased: compute) and convey a bandwidth coverage 14 (information) of an optical communication modality within the space 20. The optical communication modality is Li-Fi. Namely: each one of the plurality of lighting devices 21, 22, 23 comprises a respective optical transmitter 211, 221, 231 arranged for communicating over Li-Fi.

In an alternative embodiment, the lighting devices may be omitted, and the space may instead comprise standalone optical transmitters, as it is not necessary to embed the optical transmitters in the lighting devices, such as luminaires.

The optical transmitter 211 of the first lighting device 21 comprises a wider cone angle and its footprint covers a larger part of the space 20 compared to the respective optical transmitter 221, 231 of the second lighting device 22 and the third lighting device 23. Moreover, the optical transmitter 211 of the first lighting device 21 is positioned in the middle relative to the first lighting device (i.e. e.g. in the middle of its respective housing). The respective optical transmitter 221, 231 of the second lighting device 22 and the third lighting device 23 are positioned asymmetrically within (the housing of) the corresponding lighting device 22, 23.

The very positioning of the optical transmitter within the lighting device affects the beaconing characteristics of said optical transmitter and thereby the bandwidth that the optical transmitter may achieve in operation.

Still referring to FIG. 1, the computing device 10 comprises a controller 11 and an output interface 12 (operatively coupled to said controller 11). The output interface 12 is a touch sensitive display. Thus, the output interface 12 may simultaneously serve as a user input device having a user interface. Such a user interface may mutatis mutandis be schematically depicted, by non-limiting example, in FIG. 3. The computing device 10 further comprises a local memory 13 for storing a database with a plurality of configuration data and a database with a plurality of lighting data. The controller 11 is arranged for displaying a representation of the plurality of configuration data to the user 1 via said output means 12 at a moment in time, and arranged for displaying a representation of the plurality of lighting data to the user 1 via said output means 12 at a moment in time. The controller 11 is further configured to receive a user input, which user input is indicative of the user 1 selecting configuration data from the indicated plurality of configuration data, and/or selecting lighting data from the indicated plurality of lighting data. The user input is received by the touch sensitive display 12. Hence, by means of such a user input, the controller 11 obtains configuration data characterizing configuration of said space 20, and the controller 11 obtains lighting data characterizing the respective optical transmitter of the three lighting devices 21, 22, 23. The user input may in examples comprise a drag and drop action.

Namely: The user 1 inputs (at least) a selection of a geometrical feature of the space 20. Such a geometrical feature may e.g. be a map or contour indicating the boundaries and the geometry of the space 20 (or e.g. a location of a furniture within said space 20) (or e.g. a location of a window within said space). The user 1 inputs (at least) the location of the lighting devices 21, 22, 23 within the space 20 (or e.g. the location of the lighting devices relative to a furniture within said space, without requiring the absolute reference of said space). This information constitutes configuration data.

Alternatively, part of the configuration data may be stored on the local memory beforehand as a constant value, and the controller may retrieve said part of the configuration from said local memory. For example, the height of the space may be a predefined constant, or the layout of the space may be stored beforehand in said local memory. Hence, for such data, constant and/or predefined values may initially be used, e.g. standard room height, if for example no further user input is present to overrule said initial data.

Furthermore, in the present exemplar embodiment, the user inputs (at least) the type of the at least one optical transmitter 211, 221, 231 (or alternatively the type of the three lighting devices). This information constitutes lighting data. This is however not necessary, because the type of the at least one optical transmitter or at least one lighting device may alternatively be a predefined constant, which predefined constant may for example be retrieved from the local memory 13, or alternatively from a remote server (not depicted); yet alternatively, said lighting data may be received from a sensor device (not depicted).

The configuration data according to the invention and the lighting data according to the invention are subsequently used by the controller 11 to determine the bandwidth coverage 14 of the optical communication modality within the space 20.

Because the configuration data and/or the lighting data may comprise other parameters as well, like mentioned in this application before, the bandwidth coverage may be determined with increasingly more accuracy. For example, the configuration data may alternatively comprise the height of the space as well.

Still referring to FIG. 1, the output interface 12 of the computing device 100 conveys a signal indicative of the determined bandwidth coverage 14 of the optical communication modality within the space 200 by displaying the signal. The signal may for example be translated and visualized as a heat map of bandwidth values within a representation of said space 200.

Alternatively, in embodiments, the controller determines requirement parameter of the optical communication modality within the space based on the configuration data and/or the lighting data. The computing device conveys, via the output interface, a signal indicative of the requirement parameter of the optical communication modality within the space. This requirement parameter may be the number of modems required. Thus, the signal may be indicative of the number of modems required.

Here, additionally but not necessarily, the computing device 10 may comprise a localization sensor for determining the location 16 of the computing device (such as e.g. via GPS) in said space 20, which location 16 may subsequently be visualized together with the bandwidth coverage 14.

Hence, without having to measure signal strength values within the space 20, a user 1 may advantageously obtain the bandwidth coverage of Li-Fi within said space 20, which may become increasingly more accurate by taking more parameters of said configuration data and/or said lighting data into account.

In alternative examples, instead of a user selecting the configuration data and/or the lighting data as mentioned above, the configuration data and/or the lighting data may be obtained from a sensor device. For example, said computing device or another electronic device may comprise a camera for capturing a recording (e.g. image) of said space. Image analysis may subsequently be implemented to detect (or: derive, or: determine, or: calculate) for example the contours of the room, the location of the optical transmitters and/or lighting devices within said room, the location of lighting devices and/or optical transmitters relative to furniture within said room, the height of said room, the type of the lighting devices within said room, et cetera. These detected parameters may subsequently form the configuration data and/or the lighting data. The controller of the computing device may thus receive or retrieve (part or whole of) said configuration data and/or the lighting data from such a sensor device.

In alternative examples, instead of a user selecting the configuration data and/or the lighting data as mentioned above, the configuration data and/or the lighting data may be obtained (e.g. partly or as a whole) from a building management system or remote server, which may already at least partly comprise the configuration data and/or the lighting data. For example, during commissioning of the space, the building management system may already be populated with relevant data for the present invention.

Yet alternatively, in a further embodiment, the computing device may comprise an optical communication module. The optical communication module may operate on Li-Fi. The signal according to the invention, which is indicative of the determined bandwidth coverage of the optical communication modality within the space, may only be displayed on the display upon the controller establishes an optical communication link between the optical communication module and the respective optical transceiver of one of the lighting devices. Hence, each time the user establishes an optical communication link within the space, the display may indicate the Li-Fi bandwidth coverage within said space, such that the user may (be inclined to) position and/or orient the computing device accordingly to achieve the best guaranteed bandwidth.

Figure 2:
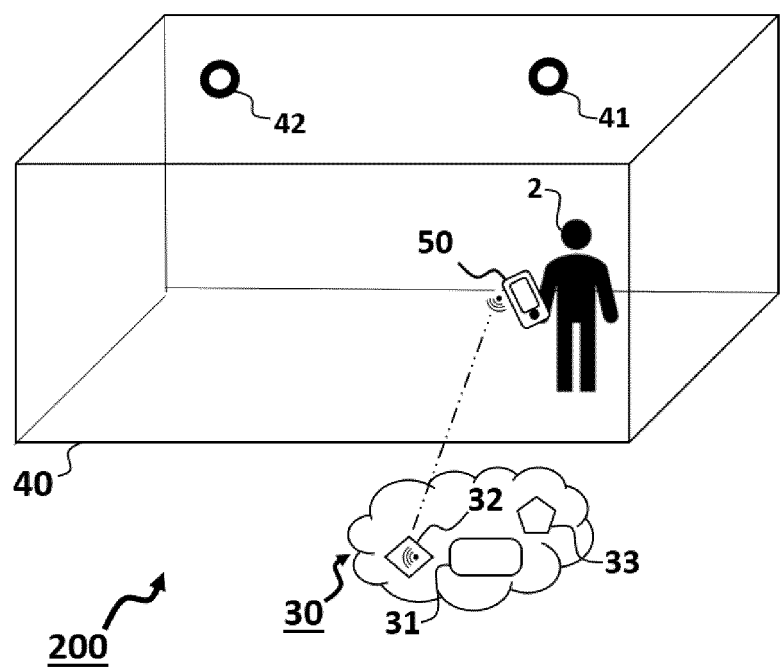
FIG. 2 depicts schematically a system according to the invention comprising the computing device according to the invention.

FIG. 2 depicts schematically, by non-limiting example, a system 200 according to the invention. The system 200 comprises a computing device 30 according to the invention. The system is partly envisioned in a space 40. The space 40 is an indoor office. The space 40 comprises two optical transmitters 41, 42 mounted to the ceiling of said space 40. The optical transmitters 41, 42 are the same and are arranged for communicating over Li-Fi with a portable user device 50. This optical communication may alternatively be over VLC.

The computing device 30 is external to the space 40 and is in communication over the internet, (initially via Wi-Fi and via a modem (not depicted) and subsequently through a wired connection of the modem) with the portable user device 50. The portable user device 50 is carried by a user 2 and runs an application enabling such communication with the computing device 30. The computing device 30 is here a remote server.

Figure 4:
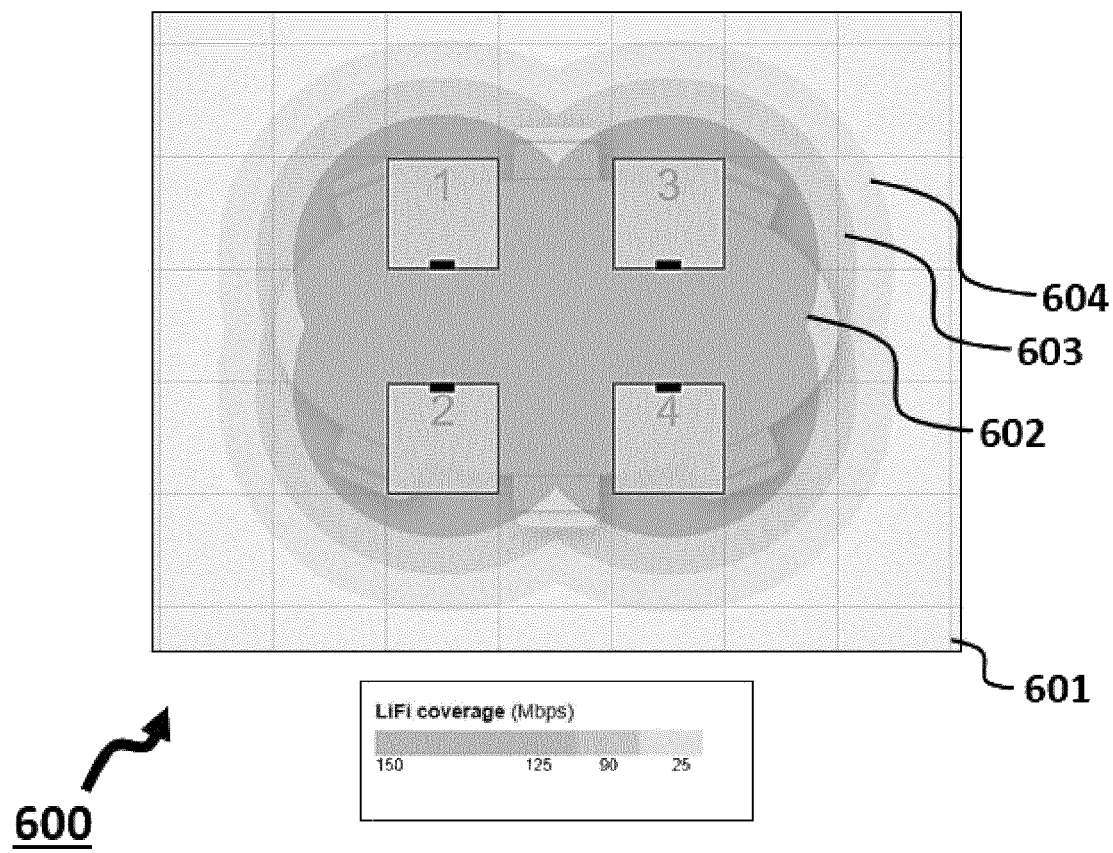
FIG. 4 depicts schematically a Li-Fi bandwidth coverage according to the invention.

The computing device 30 is configured to determine and convey a bandwidth coverage of an optical communication modality within the space (not explicitly depicted in FIG. 2, but e.g. schematically depicted in FIG. 4 as an example). The optical communication modality is thus Li-Fi. Moreover, the computing device 30 comprises a controller 31 and an output interface 32 (operatively coupled to said controller 31). The output interface 32 is an internet transceiver establishing an internet connection. Alternatively, said output means may be a Bluetooth transmitter, Wi-Fi transmitter, ZigBee transmitter, DALI transmitter, IR transmitter, RF transmitter, VLC transmitter, etc.

The controller 31 is configured to receive a user input from said portable user device 50. The user input may be provided via a user interface. Such a user interface may mutatis mutandis be schematically depicted, by non-limiting example, in FIG. 3. Here, the user input comprises part of the configuration data and part of the lighting data according to the invention. Namely, the user input specifies the contours of the space 40, and the location of the optical transmitters 41, 42 within said contours of said space 40. This constitutes part of both the configuration data and the lighting data (i.e. lighting data because the user input indicates that optical transmitters are present and not e.g. luminaires).

The controller 31 obtains (not necessary) other parts of the configuration data and/or lighting data from a local memory 33 comprised by the computing device 30. This part of the data is predefined and stored in said local memory 33, such as the height of the space 40, and the (e.g. average) optical characteristics of the optical transceivers 41, 42.

Still referring to FIG. 2, the controller 31 determines the Li-Fi bandwidth coverage within the space 40 based on the obtained configuration data and the lighting data. The output interface 32 subsequently conveys a signal indicative of the bandwidth coverage of the optical communication modality within the space 40 to the portable user device 50 (either by transmitting or allowing the portable user device 50 to retrieve).

Here, the signal comprises a format having a value representation of the Li-Fi bandwidth coverage within the space 40 represented in the contour (or alternatively a map) of the space 40.

Figure 3:
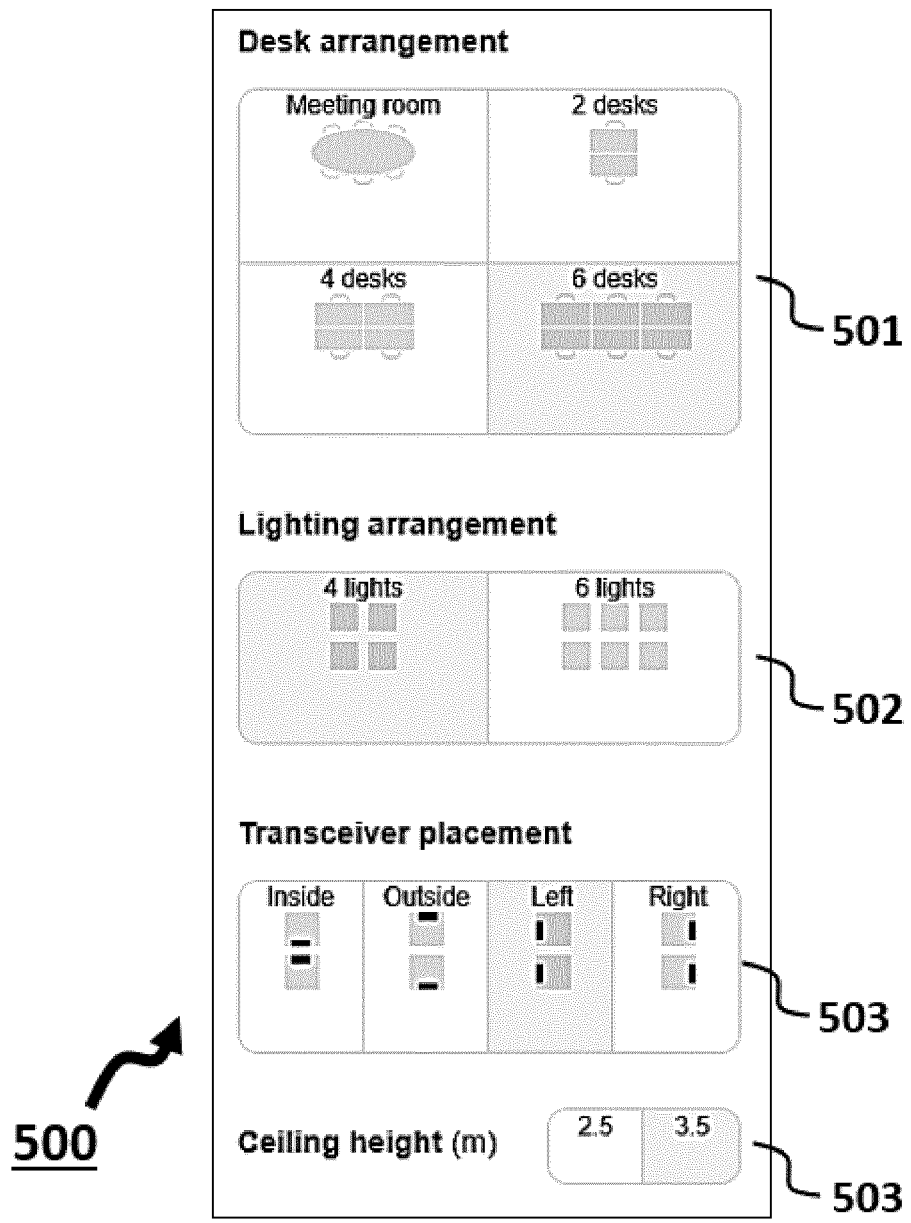
FIG. 3 depicts schematically a user interface according to the invention.

FIG. 3 depicts schematically, by non-limiting example, a user interface 500 for selecting configuration data and lighting data. The user interface 500 may be displayed on a user device, such as a portable user device, e.g. a smartphone with touch sensitive display. The user interface 500 relates to the configuration of a space and to the characteristics of a lighting device comprising optical transceivers within said space. Alternatively, said lighting devices and/or optical transceivers may be optical transmitters.

The user interface comprises a first selection element 501 related to a presence of a furniture within the space and the type of furniture within the space. This first selection element 501 is hence named 'desk arrangement'. Since the space may be an office space, and since such an office space may comprise a variety of types of furniture, such a first selection element 501 may be valuable in characterizing the configuration of said space. The relative location of lighting devices and associated optical transceivers (or: transmitters) may be related relative to such furniture, or desk arrangement.

The first selection element 501 offers the option of selecting four different types of desk arrangements of furniture within said space. A user may select a single round meeting room table, two adjacent rectangular desks, four adjacent rectangular desks organized in a 2×2 square, or six adjacent rectangular desks organized in a 2×3 rectangle. The desk arrangement may determine how lighting devices comprising the optical transceivers are positioned relative to each other, hence indirectly determining the location of such lighting devices (and associated optical transceivers) within the space (i.e. thus relatively to the desk(s) and not absolutely defined on coordinates of the space).

The user interface 500 comprises a second selection element 502 related to, and named as, lighting arrangement. Such a second selection element 502 may be valuable in characterizing the configuration of said space. Still referring to FIG. 3, since the desk arrangement is depicted to be selected as six desks, the second selection element 502 offers two options for selecting a lighting arrangement. Namely, four lights in a 2×2 arrangement above the desks, or six lights in a 2×3 arrangement above the desks. Alternatively, when a single meeting room desk arrangement is selected, a single light in the center of the meeting room desk arrangement, or two lights in a 2×1 matrix above the center of the meeting room desk arrangement, may be selected as an option.

The user interface 500 comprises a third selection element 503 related to, and named as, transceiver placement. Such a third selection element 503 may be valuable in characterizing the properties of the lighting device within said space. Hence, the third selection element 504 provides part of the lighting data. The very positioning of the optical transceiver within the lighting device namely affects the beaconing characteristics of said optical transceiver and thereby the bandwidth that the optical transceiver may guarantee in operation. Still referring to FIG. 3, the third selection element 503 offers the option of selecting four different types of transceiver placement options, e.g. inside or outside the lighting device (e.g. luminaire).

The user interface 500 comprises a fourth selection element 504. The fourth selection element 504 is ceiling height, i.e. the height of the placement of the lighting devices according to the invention. The fourth selection element 504 offers an option to set the ceiling height to either 2.5 meter or 3.5 meter. Ceiling height is part of the configuration data.

The user interface 500 may alternatively comprise further selection elements, which further selection elements may relate to other parameters mentioned in this application when discussing the configuration data and/or the lighting data. The selection elements may be sliders and/or pop-up windows. The selection elements may be displayed as a list on said user interface, or displayed on a map of the space on said user interface. The user interface may further comprise buttons to confirm selection and/or transmit the selections (i.e. the data) to the controller of the computing device. Other types of user interfaces may similarly be envisioned, and the invention is not limited to the above examples.

FIG. 4 depicts schematically, by non-limiting example, a bandwidth coverage 600 of the optical communication modality within the space 601. The optical communication modality is Li-Fi. Referring to FIG. 4, the bandwidth coverage is computed for a single meeting room desk arrangement; having an arrangement of four lighting devices in a 2×2 matrix above the single meeting room desk; with optical transceivers located at the inside of the lighting devices (i.e. pointing to the center of the single meeting room desk); and wherein the lighting devices are located at a 2.5 meter ceiling height. The bandwidth coverage 600 is thereby indicated in contour lines 602, 603, 604 indicative of bandwidth ranges.

Such a bandwidth coverage 600 may originate from a signal according to the invention, wherein the signal comprises a format having a value representation of the bandwidth coverage of the optical communication modality within the space represented in the map of the space. Such a bandwidth coverage 600 may be displayed on a user interface, e.g. of a portable user device or computing device, or computer.

Figure 5:
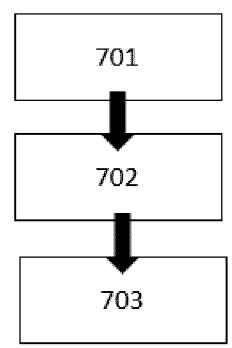
FIG. 5 depicts schematically a method according to the invention.
Figure 5:

FIG. 5 depicts schematically a method 700 according to the invention. The method determines and conveys a bandwidth coverage of an optical communication modality within a space, wherein the space comprises at least one optical transmitter arranged for communicating over said optical communication modality. The method comprises a step 701 of obtaining configuration data characterizing a configuration of said space; obtaining lighting data characterizing the at least one optical transmitter. The method comprises a step 702 of determining the bandwidth coverage of the optical communication modality within the space based on the configuration data and the lighting data. The method comprises a step 703 of conveying a signal indicative of the bandwidth coverage of the optical communication modality within the space. Alternative steps may be envisioned mutatis mutandis corresponding to the embodiments of the computing device according to the invention.

The invention claimed is:

1. A computing device for determining and conveying a bandwidth coverage of an optical communication modality within a space, wherein the space comprises at least one optical transmitter arranged for communicating over said optical communication modality;
   wherein the computing device comprises a controller configured to:
   obtain configuration data characterizing a configuration of said space;
   obtain lighting data characterizing the at least one optical transmitter;
   compute the bandwidth coverage of the optical communication modality within the space based on the configuration data and the lighting data;
   wherein the computing device comprises an output interface configured to:
   convey a signal indicative of the bandwidth coverage of the optical communication modality within the space.

2. The computing device according to claim 1, wherein the controller is configured to:
   determine a requirement parameter for rendering said bandwidth coverage of the optical communication modality within the space based on the configuration data and/or the lighting data;
   wherein the output interface configured to:
   convey a signal indicative of the bandwidth coverage of the optical communication modality within the space and indicative of the requirement parameter;
   wherein the requirement parameter is at least one of: a number of optical communication modems, a grouping of optical communication modems.

3. The computing device according to claim 1, wherein the configuration data comprises at least one of:
   a location of the at least one optical transmitter within the space;
   a map of the space;
   a height of the space;
   a geometry of the space;
   a contour of the space;
   a location of a furniture in said space;
   a location of a window in said space;
   a location of an aperture in said space;
   a location of an electronic device in said space;
   a location of a reflective surface in said space;
   a location of an illumination source in said space.

4. The computing device according to claim 1, wherein the lighting data comprises at least one of:
   a type of the at least one optical transmitter;
   a positioning of the at least one optical transmitter relative to a lighting device;
   a directionality of the at least one optical transmitter;
   an optical distribution of the at least one optical transmitter;
   a cone angle of the at least one optical transmitter;
   an intensity level of light emitted by the at least one optical transmitter.

5. The computing device according to claim 1, wherein the optical communication modality is VLC or Li-Fi.

6. The computing device according to claim 1, wherein the controller is configured to retrieve and/or receive said configuration data and/or said lighting data from a remote server.

7. The computing device according to claim 1, wherein the computing device comprises a local memory for storing the configuration data and/or said lighting data, and the controller is configured to retrieve said configuration data and/or said lighting data from the local memory.

8. The computing device according to claim 1, wherein the controller is configured to receive said configuration data and/or said lighting data from a sensor device and/or a user input device.

9. The computing device according to claim 8, wherein the computing device comprises an optical communication module, wherein the output interface comprises a display, wherein the controller is configured to display the signal on said display upon the controller establishing an optical communication link between the optical communication module and the respective optical transmitter.

10. The computing device according to claim 9, wherein the configuration data comprises a map of the space;
wherein the signal comprises a format having a value representation of the bandwidth coverage of the optical communication modality within the space represented in the map of the space.

11. The computing device according to claim 1, wherein the controller is configured to receive an output file of a lighting design application, wherein the output file of said lighting design application comprises the configuration data and/or said lighting data.

12. The computing device according to claim 1, wherein the output interface comprises a transmitter, wherein the controller is configured to transmit the signal via said transmitter to a user device.

13. The computing device according to claim 1, wherein an optical transmitter of the at least one optical transmitter is positioned asymmetrically within a respective lighting device; and wherein the lighting data comprises a positioning of the respective optical transmitter relative to the respective lighting device.

14. A system for determining and conveying a bandwidth coverage of an optical communication modality within a space, wherein the system comprises:
the computing device according to claim 1, and
at least one optical transmitter arranged for communicating over said optical communication modality.

15. A method of determining and conveying a bandwidth coverage of an optical communication modality within a space, wherein the space comprises at least one optical transmitter arranged for communicating over said optical communication modality;
wherein the method comprises:
obtaining configuration data characterizing a configuration of said space;
obtaining lighting data characterizing the at least one optical transmitter;
determining the bandwidth coverage of the optical communication modality within the space based on the configuration data and the lighting data; and
conveying a signal indicative of the bandwidth coverage of the optical communication modality within the space.

* * * * *